(12) United States Patent
Barazesh et al.

(10) Patent No.: US 7,949,723 B2
(45) Date of Patent: May 24, 2011

(54) REAL TIME TUNER FOR PROVIDING GRAPHICAL USER INTERFACE

(75) Inventors: Bahman Barazesh, Marlboro, NJ (US); Kannan Rajamani, Edison, NJ (US); Steven C. Szep, Lowhill Township, Lehigh County, PA (US); Nitin Kumar Varma, Somerset, NJ (US); Tomasz Janusz Wolak, Howell, NJ (US)

(73) Assignee: Agere Systems Inc., Allentown, PA (US)

( * ) Notice: Subject to any disclaimer, the term of this patent is extended or adjusted under 35 U.S.C. 154(b) by 2688 days.

(21) Appl. No.: 10/438,109

(22) Filed: May 14, 2003

(65) Prior Publication Data

US 2003/0236901 A1 Dec. 25, 2003

Related U.S. Application Data

(60) Provisional application No. 60/380,393, filed on May 14, 2002.

(51) Int. Cl.
*G06F 15/16* (2006.01)
(52) U.S. Cl. ........ 709/217; 709/223; 370/352; 370/260; 455/452
(58) Field of Classification Search ................... 709/217, 709/223; 370/352, 260; 455/452
See application file for complete search history.

(56) References Cited

U.S. PATENT DOCUMENTS

| | | | | |
|---|---|---|---|---|
| 6,392,999 B1 * | 5/2002 | Liu et al. | ........................ | 370/260 |
| 6,629,197 B1 * | 9/2003 | Bhogal et al. | ................. | 711/111 |
| 6,760,324 B1 * | 7/2004 | Scott et al. | .................... | 370/352 |
| 6,965,562 B2 * | 11/2005 | Tuomi | ............................ | 370/230 |
| 6,970,915 B1 * | 11/2005 | Partovi et al. | ................. | 709/217 |
| 7,075,921 B2 * | 7/2006 | Siegrist et al. | ................ | 370/352 |
| 2002/0178279 A1 * | 11/2002 | Janik et al. | .................... | 709/231 |
| 2002/0180803 A1 * | 12/2002 | Kaplan et al. | ................. | 345/810 |
| 2003/0030676 A1 * | 2/2003 | Iyer | ................................ | 345/810 |
| 2003/0060210 A1 * | 3/2003 | Ravishankar et al. | ......... | 455/452 |
| 2003/0167174 A1 * | 9/2003 | Dagtas et al. | ................. | 704/275 |

* cited by examiner

*Primary Examiner* — Tammy T Nguyen
(74) *Attorney, Agent, or Firm* — Mendelsohn, Drucker & Associates, P.C.; Steve Mendelsohn

(57) ABSTRACT

A unique real time tuning (RTT) process is employed for obtaining the desired optimum device parameter adjustments. The RTT parameter adjustment process is utilized with IP phone or other device chipsets as desired. In one embodiment, RTT provides a graphical user interface to a digital signal processor (DSP), or the like, on the device chipset allowing for observation, evaluation and control of the device parameters in real time. The real time exchange of the device parameter information between the device and an external workstation, e.g., a personal computer or the like, is provided by a User Datagram Protocol (UDP) that runs on a controller on the device, e.g., an ARM processor or the like. In this example, the unique combination of the RTT, UDP and DSP cooperate advantageously to implement, in accordance with the principles of the invention, the desired observability, and control to designers to tune the device, e.g., IP Phone, in real time to specified hardware, plastics, audio requirements required by existing standards or the like.

18 Claims, 16 Drawing Sheets

REAL TIME TUNER FOR PROVIDING GRAPHICAL USER INTERFACE

RELATED APPLICATIONS

This application claims the priority of the corresponding provisional application, Serial No. 60/380,393, filed May 14, 2002.

TECHNICAL FIELD

This invention relates to the adjustment of device parameters and, more particularly, to the real time tuning of the device parameters.

BACKGROUND OF THE INVENTION

Internet Protocol (IP) phones and similar devices typically have several parameters such as gains, equalizers, echo canceler control, etc. that need to be tuned to obtain the best audio quality or the like. Usually, the tuning procedure is iterative, a parameter is changed at a time and the audio quality is tested by listening in real-time. Sometimes the parameters interact with each other and this process needs to be repeated until optimal quality is obtained. This is typically done by using a local test/debug port in the IP phone and a command line interpreter to monitor and control the parameters. For example, the user types a command to display the current value of a parameter and then sends another command to change its value. This process is typically limited to one parameter at a time and is not in real-time. Tuning parameters of an IP phone takes time and the product design cycle has to accommodate longer tuning cycles. A local port is needed to access the parameters and tuning of remote IP phones is not possible. A more efficient process is needed.

SUMMARY OF THE INVENTION

These and other problems and limitations of prior arrangements are overcome by employing a unique real time tuning (RTT) process for obtaining the desired optimum device parameter adjustments.

The RTT parameter adjustment process is utilized with IP phone or other device chipsets as desired.

In one embodiment, RTT provides a graphical user interface to a digital signal processor (DSP), or the like, on the device chipset allowing for observation, evaluation and control of the device parameters in real time. The real time exchange of the device parameter information between the device and an external workstation, e.g., a personal computer or the like, is provided by a User Datagram Protocol (UDP) that runs on a controller on the device, e.g., an ARM processor or the like. In one example, the unique combination of the RTT, UDP and DSP cooperate advantageously to implement, in accordance with the principles of the invention, the desired observability and controllability to designers to tune the device, e.g., an IP Phone, in real time to specified hardware, plastics and audio requirements required by existing standards or the like.

Indeed, applicants' unique invention provides, among others, the following advantages:

1) Monitor, control and tune in real-time any device, e.g., any IP phone in the IP network;
2) Visualize and control the IP phone block diagram with all its parameters on a workstation graphical interface;
3) Reduce tuning time significantly and, hence, shorten the device design cycle.

Without the RTT, UDP and DSP processes that provide the designers a real time graphical interface of the device parameters, the tuning process becomes a tedious one, adjusting one parameter at a time process that was lengthy and inefficient.

DETAILED DESCRIPTION

Figure 1:
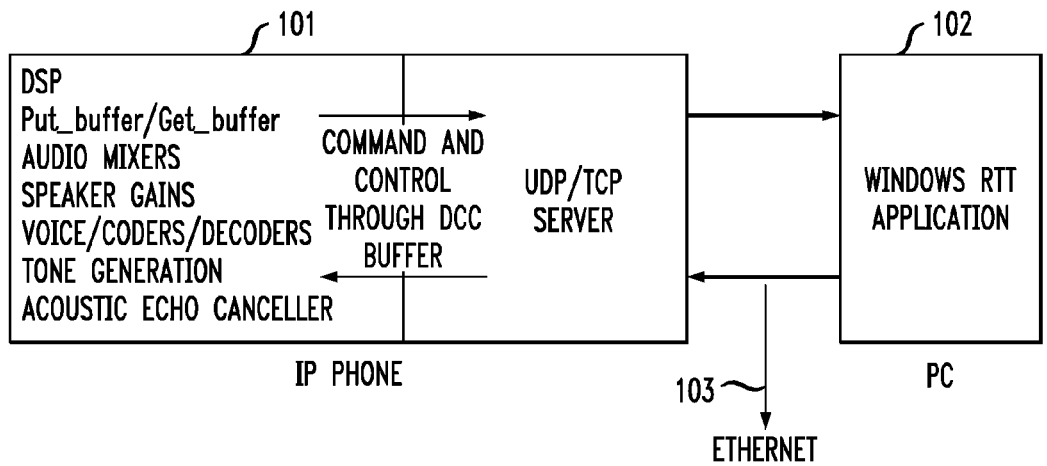
FIG. 1 is a broad block diagram of the invention showing functionality and information flow between RTT and the device.

FIG. 1 is a broad block diagram of the invention showing functionality and information flow between RTT and the device, in this example, an IP (Internet Protocol) Phone chipset. Shown in FIG. 1 are a personal computer 102 running RTT application software, which is used with a particular device chipset, for example, IP Phone chipset 101.

RTT 102 provides a graphical interface to the DSP (Digital Signal Processor) functionality of the chipset, allowing evaluation and optimization of DSP functions. Hereinafter, the device chipset is known as IPT_DSP. The DSP functionality includes, in this example, a Put_buffer/Get_buffer, audio mixers, speaker gains, voice coders/decoders, tone generation, equalizers, acoustic echo canceler; command and control through a DCC (DSP Communication Control) buffer; and a UDP/TCP server.

The RRT software runs on a PC 102 and communicates with IP Phone systems 101 via the Ethernet 103. With RTT, the user can set internal values in the IPT_DSP and can monitor the state of the system in real time. Tools are provided to automate common tasks such as measuring the sensitivity of speakers and microphones being used with the IP Phone chipset 101. Test buffers provide easy access to input and output points in the system to facilitate testing. When the audio characteristics have been adequately tuned, the settings can be saved as source files and compiled into the final DSP image that is loaded when the IP Phone 101 boots up.

As indicated above, FIG. 1 shows the different components involved to implement the RTT tool. The RTT application running on the PC 102 presents a graphical interface with all of the IP Phone 101 parameters taking advantage of all facilities available in a Windows system. With RTT, the user can set and visualize internal values in the IP Phone and can monitor the state of the system in real time. The PC 102 application interacts with the UDP server embedded in the IP Phone 101, which in turn interacts with an embedded DSP using commands and responses to access the internal parameters of the IP Phone 101. A shared memory, DCC buffer is used for communications between the UDP server and the DSP (Digital Signal Processor). The choice of UDP instead of TCP/IP (Transmission Control Protocol/Internet Protocol) is to satisfy the real-time requirement of the audio signals. The audio functions and parameters could be implemented in a digital signal processor, or in a general purpose controller such as the ARM processor.

RTT provides also tools to automate common tasks such as measuring the sensitivity of speakers and microphones being used with the IP Phone 101 chipset. Test buffers provide easy access to input and output points in the system to facilitate testing. When the audio characteristics have been adequately tuned, the settings can be saved as source files and compiled into the final DSP image that is loaded when the IP Phone boots up.

The RTT is capable of making a large number of parameters embedded in an IP Phone 101 (or any other system) available to the user, on a graphical interface of a personal computer 102, for observation and control. Digital reference audio signals (files stored on the PC) can be captured or injected to various internal buffers of the IP Phone 101. This allows to fine-tune audio parameters such as transmit equalizer in real-time, to verify compliance of speech coders, to fine-tune echo canceler performance, to debug audio issues in real-time while the IP Phone 101 is actually in operation on a live IP phone conversation. Also, the speaker and microphone sensitivity curves can be computed by RTT. These characteristics are measured according to a IP phone standard.

One essential component of RTT 102 is the UDP server (User Datagram Protocol) that runs in the IP Phone 101, usually on a controller such as an ARM or a RISC (reduced instruction set computer controller) processor. The choice of UDP as a protocol allows to exchange real-time audio information between the IP Phone 101 and the Windows RTT application 102. RTT 102 uses advantageously the UDP protocol to exchange also command and status along with real-time data between the controller built into the IP phone 101 and the Windows RTT application 102. The messages received from the UDP server are passed to the signal processing unit of the IP Phone 101, which could also be implemented in the ARM controller itself in a variant of this invention. The signal processing unit, usually a DSP (Digital Signal Processor known in the art) communicates with the controller through a shared memory, referred to here as DCC (DSP Communication Control). The ARM controller and the DSP exchange information regularly, for example every 10 msec, through DCC. The DSP accepts the commands and the real-time data, and in return provides status and real-time data to the controller. This is achieved through simple put_buffer and get_buffer commands with the specific source and destination addresses of the important audio parameters such as equalizer gains, volume control, programmable analog gains, echo canceler parameters, encoded (PCM, G.729, or other speech coders), linear audio streams or the like. The unique combination of the Windows RTT application 102, the UDP server and the Signal Processing Unit cooperate advantageously to implement the desired observability and control to audio designers to tune their IP Phone 101 in real-time to the required hardware, plastics, audio requirements dictated by known IP Phone standards, such as TIA810A. It is important to note that the IP Phone 101 in itself doesn't support the real-time tuning capability. RTT takes advantage of the hardware and software components present in an IP Phone (UDP protocol, Digital Signal Processor, ARM Controller and the like), and with a small additional complexity offers a myriad of capabilities as a real-time design aid to audio engineers.

In this embodiment, the IP Phone 101 arrangement is implemented on a digital signal processor (DSP) which may be programmed in C language (or C++ or any suitable programming language). Similarly, the Personnel Computer (PC) RTT implementation 102 is also done in the C programming language (C++ or any suitable programming language). The PC 102 may interface to IP Phone 101 through the Ethernet 103, WLAN or otherwise as desired. The steps of the flowcharts shown in FIGS. 2 through 12 are readily programmed using C or C++ programming language.

Additionally, the PC may include any of a number of components, for example, a monitor, keyboard, mouse, voice input, touch screen, printer, scanner, hard disk drive, floppy disk drive Zip disc drive, CD drive, DVD drive or the like.

Figure 2:
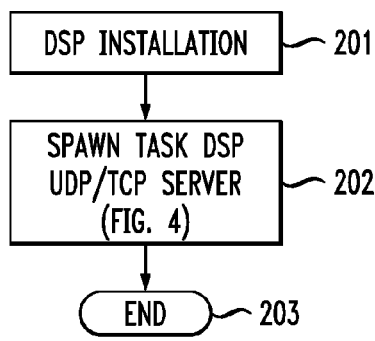
FIG. 2 is a flow chart showing the initiation process of a device to be evaluated and adjusted.

FIG. 2 is a flow chart showing the initialization process of a device, e.g., IP Phone 101, to be evaluated and adjusted. The initialization process is entered via step 201, which installs the DSP in IP Phone 101. Then, in step 202 the DSP task UDP/TCP server is spawned, see FIGS. 3 and 4. Thereafter, the initialization process is ended via step 203.

Figure 3:
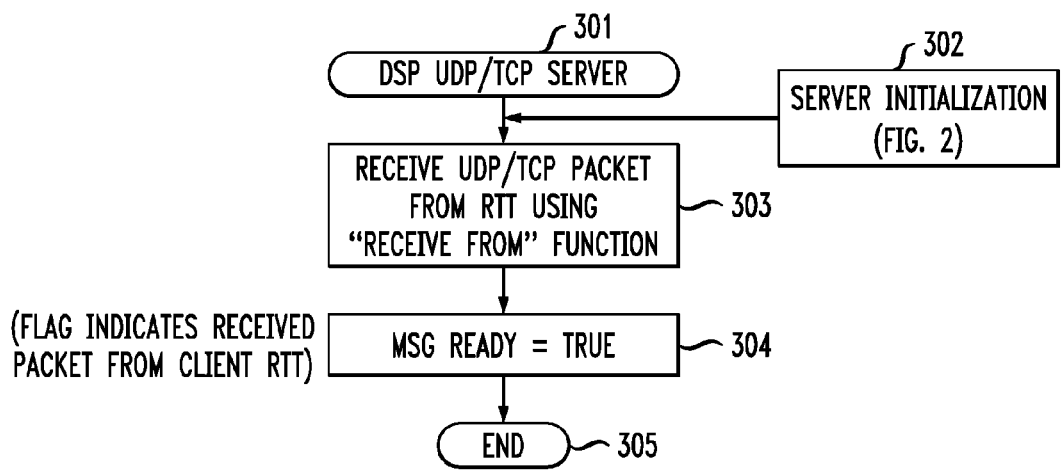
FIG. 3 is a flow chart showing reception of information from the RTT and the DSP UDP/TCP Server on the device being evaluated and adjusted.

FIG. 3 is a flow chart showing reception of information from the RTT and the DSP UDP/TCP Server on the IP Phone 101 being evaluated and adjusted. Accordingly, the DSP UDP/TCP Server process is entered via step 301. Thereafter, the server is initialized via step 302 from FIG. 2. Then, in step 303 a UDP/TCP packet is received from RTT 102 using the "receive from" function. In step 304, MSG (message) ready flag is set true upon receiving the UDP/TCP packet from RTT. Thereafter, the server process is ended in step 305.

Figure 4:
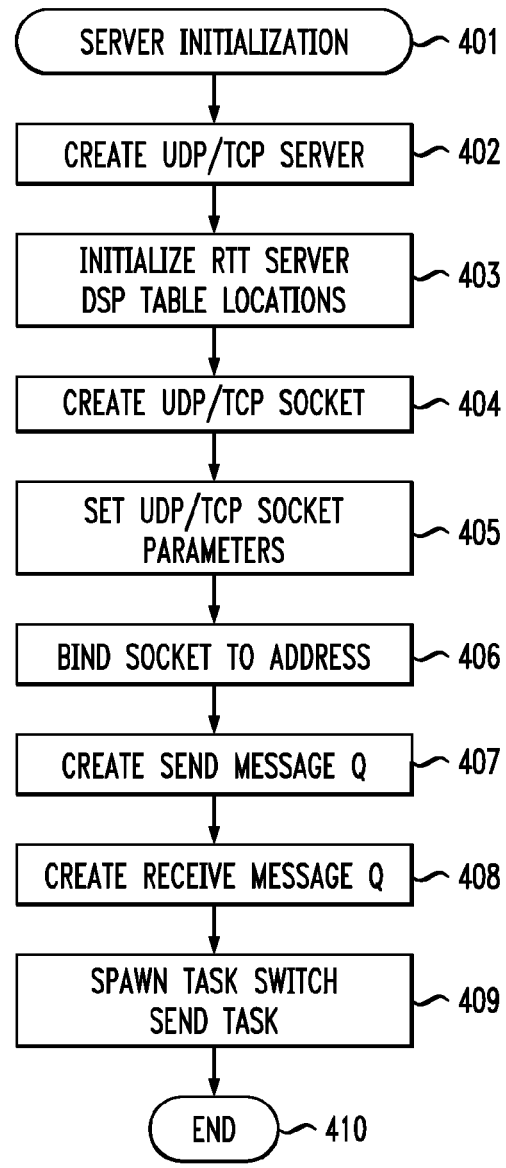
FIG. 4 is a flow chart illustrating the initialization process for the UDP/TCP server on the device.

FIG. 4 is a flow chart illustrating the initialization process for the UDP/TCP server on the device, i.e., IP phone 101. The server initialization process starts in step 401. Then, step 402 causes the UDP/TCP server to be created. Step 403 initializes the RTT server DSP table locations. The UDP/TCP socket is created in step 404. Step 405 causes the UDP/TCP socket parameters to be set. In step 406, the socket is caused to be bound to an address. Step 407 causes send message Q to be created. Step 408 causes receive message Q to be created. In Step 409 the task send switch is spawned along with send task. Thereafter, the initialization process is ended in step 410.

Figure 5:
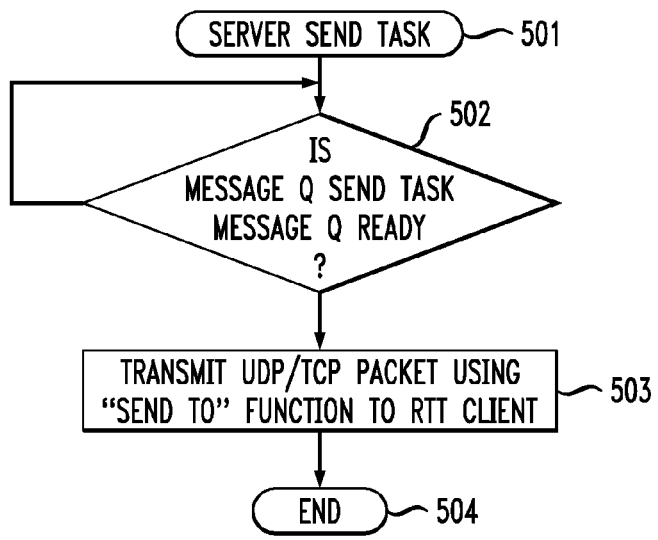
FIG. 5 is a flow chart showing the UDP/TCP server send process.

FIG. 5 is a flow chart showing the UDP/TCP server send process. The server send task process is started in step 501.

Then, step 502 tests to determine if message Q send task message Q id ready. If the test result in step 502 is NO, step 502 is iterated until it yields a YES result. Then, step 503 causes the UDP/TCP packet to be transmitted using the "send to" function to the RTT 102 UDP client. Thereafter, the UDP/TCP server send process is ended in step 504.

It should be noted that the receive packets received at the IP Phone 101 UDP/TCP server include the commands and control of the controllable parameters in the IP audio device. Similarly, the send packets transmitted from the IP phone 101 include information regarding the parameters which is to be supplied to the RTT 102 UDP client.

Figure 6:
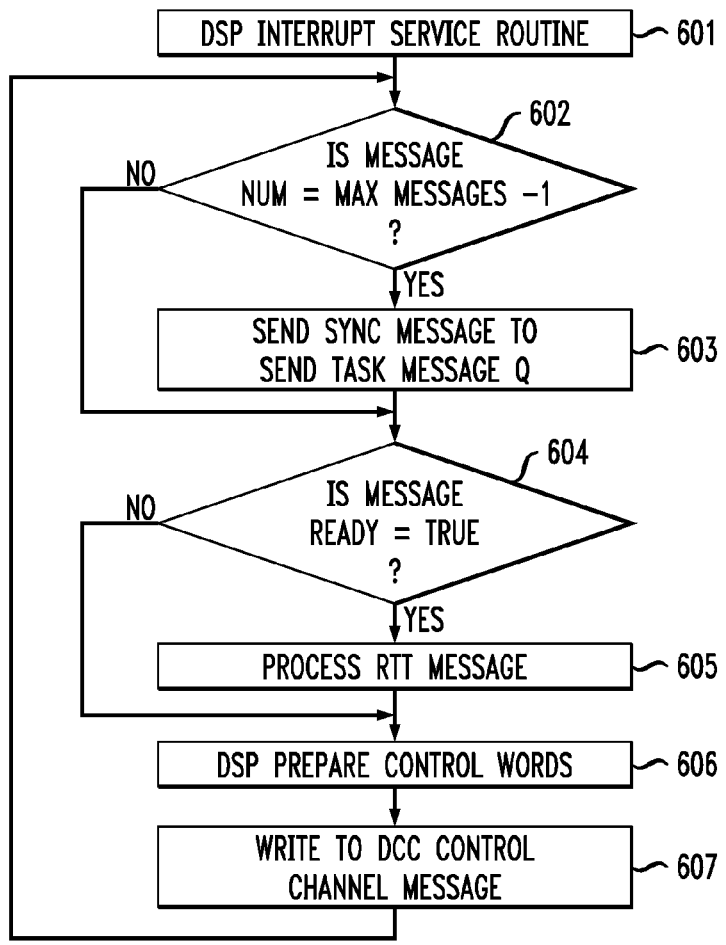
FIG. 6 is a flow chart illustrating the DSP interrupt process.

FIG. 6 is a flow chart illustrating the DSP interrupt process. The DSP interrupt service routine is started in step 601. Then, step 602 tests to determine if the message number equals the maximum number of messages −1. If the test result in step 602 is YES, step 603 sends a sync message to send task message Q and control is transferred to step 604. If the test result in step 602 is NO, control is transferred directly to step 604, which tests to determine if message ready is true. If the test result in step 604 is YES, step 605 causes the RTT message to be processed and control is transferred to step 606. If the test result in step 604 is NO, control is transferred directly to step 606, which causes the DSP control words to be prepared. Thereafter, step 607 causes a write to DCC control channel to process the RTT requests, e.g., to read a parameter from the DSP. Then, control is returned to step 602, and appropriate ones of steps 602 through 607 are iterated.

Figure 7:
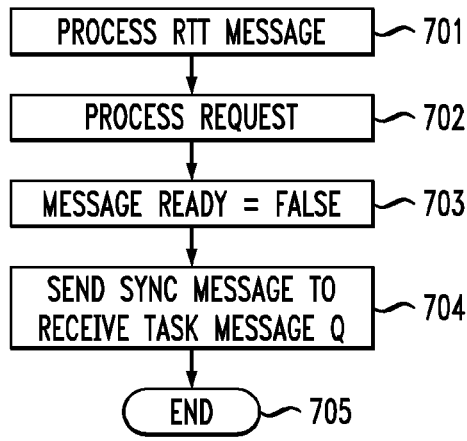
FIG. 7 is a flow chart showing the steps in the RTT message process on the device.

FIG. 7 is a flow chart showing the steps in the RTT message process on the IP Phone 101 chipset. The process is started in step 701 by processing the RTT message. Then, step 702 causes a process request to be effected. Step 703 sets the message ready indication to false. Step 704 causes a sync message to be sent to receive task message Q. Thereafter, the process is ended in step 705.

Figure 8:
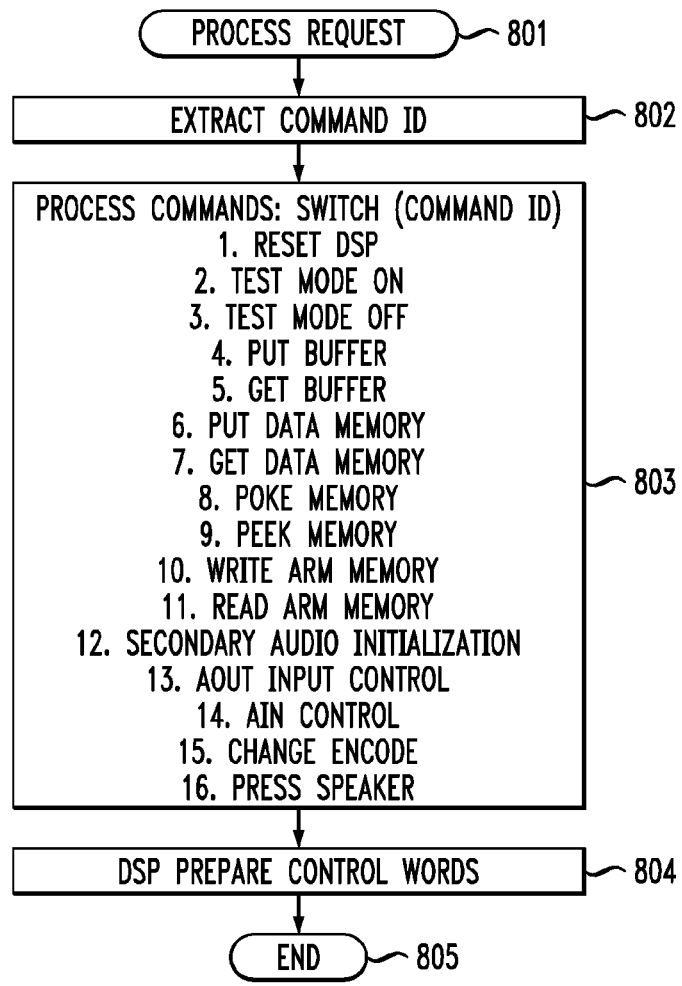
FIG. 8 is a flow chart illustrating the steps in the process request process on the device.

FIG. 8 is a flow chart illustrating the steps in the process request process on the IP Phone 101 chipset. The process request process is started in step 801. Then, step 802 causes extraction of the command ID. In step 803, the commands are processed, i.e., the command ID is switched. The commands are 1) Reset DSP, 2) Test Mode ON, 3) Test Mode OFF, 4) Put Buffer, 5) Get Buffer, 6) Put Data Memory, 7) Get Data Memory, 8) Poke Memory, 9) Peek Memory, 10) Write ARM Memory, 11) Read ARM Memory, 12) Secondary Audio Initialization, 13) AOUT Input Control, 14) AIN Control, 15) Change encode, 16) Press Speaker and the like. Then, in step 804, the DSP control words are prepared to perform one of the functions that are listed in FIG. 8. The process is then ended in step 805.

Figure 9:
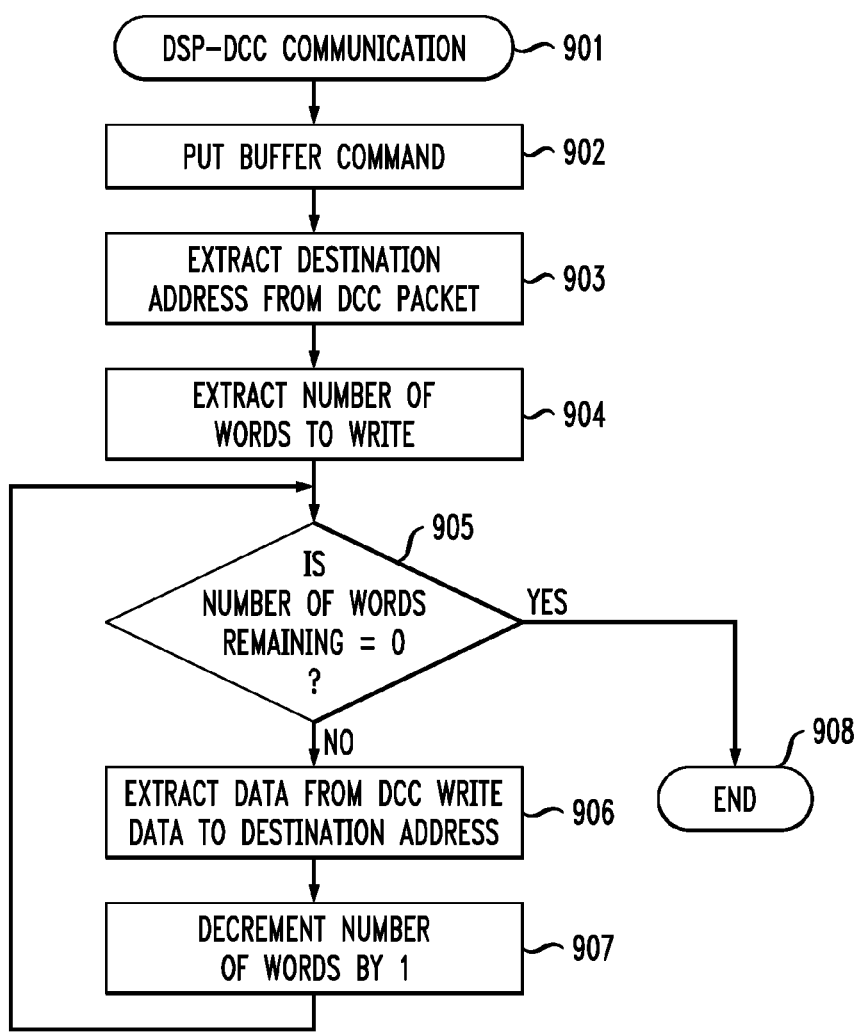
FIG. 9 is a flow chart showing the steps in the DSP-DCC communication process on the device.

FIG. 9 is a flow chart showing the steps in the DSP-DCC communication process on the IP Phone 101 chip set for Put Buffer Command. The DSP-DCC write communications process is started in step 901. Then, step 902 causes the process to perform the Put Buffer Command. In step 903, the destination address is extracted from an incoming DCC packet. Step 904 causes the number of words to write to be extracted from the DCC packet. Step 905 tests to determine if a number of words remaining is equal to zero (0). If the test result in step 905 is NO, step 906 causes data to be extracted from DCC packet and causes writing that data to the destination address. Then, step 907 decrements the number of words by one (1) and control is returned to step 905. Steps 905 through 907 are iterated until step 905 yields a YES result and no words remain. Then, the process is exited in step 908.

Figure 10:
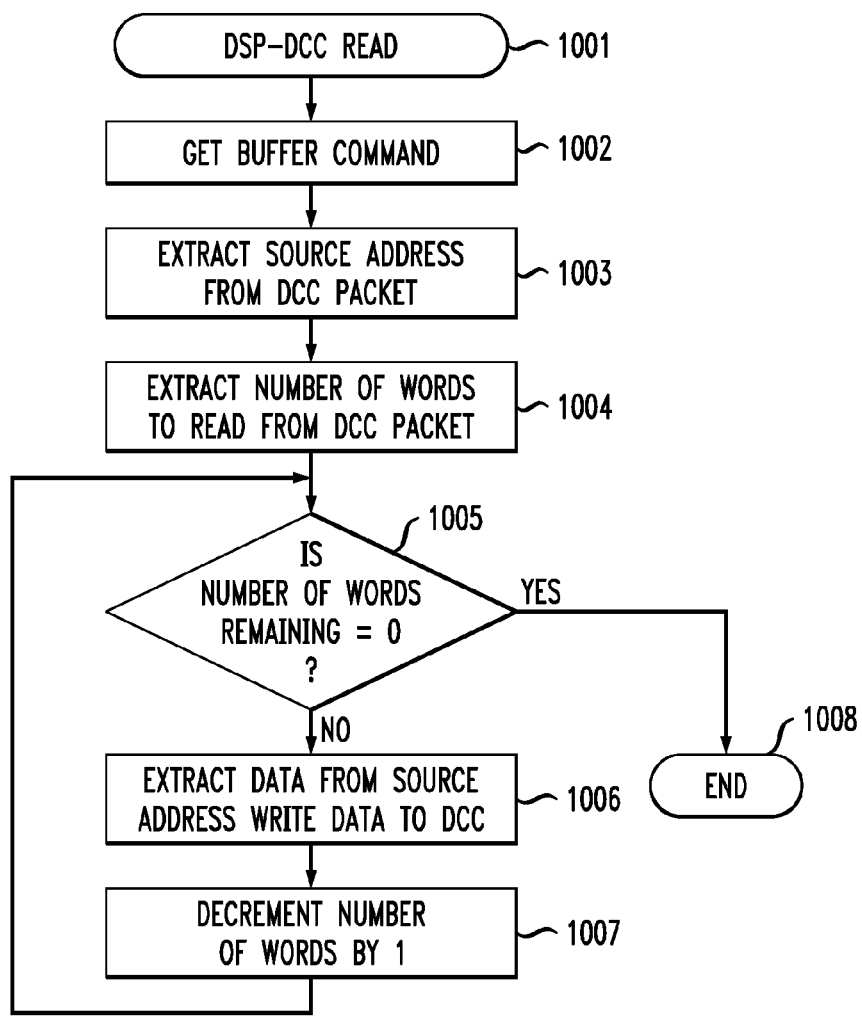
FIG. 10 is a flowchart showing steps in the DSP-DCC read process on the device.

FIG. 10 is a flowchart showing steps in the DSP-DCC communication process on the IP Phone 101 chipset for get buffer command. The DSP-DCC read communications process is started in step 1001. Then, step 1002 causes the process to perform Get Buffer Command. In step 1003, the source address is extracted from an incoming DCC packet. Step 1004 causes the number of words that has to be read to be extracted from the DCC packet. Step 1005 tests to determine if the number of words remaining is equal to zero (0). If the test result in step 1005 is NO, step 1006 causes data to be extracted from source address and causes writing that data to the DCC. Then, step 1007 decrements the number of words by one (1) and control is returned to step 1005. Steps 1005 through 1007 are iterated until step 1005 yields a YES result and no words remain. Then, the process is exited in step 1008.

Figure 11:
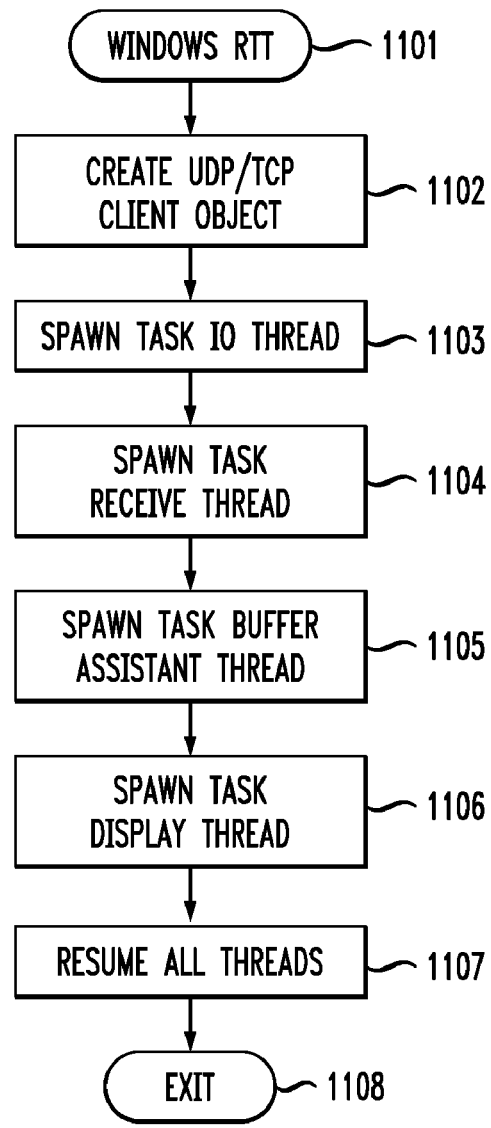
FIG. 11 is a flowchart illustrating the steps in the RTT initialization process on the workstation, e.g., personal computer.

FIG. 11 is a flowchart illustrating the steps in the RTT initialization process on the workstation, e.g., a personal computer 102. The RTT process is started in step 1101. Thereafter, step 1102 causes the creation of a UDP/TCP client object. Step 1103 spawns a task IO thread. Step 1104 spawns a task receive thread. Step 1105 spawns a task buffer assistant thread. Step 1106 spawns a task display thread. Then, step 1107 causes all threads to be resumed. Thereafter the RTT initialization process is exited in step 1108.

Figure 12:
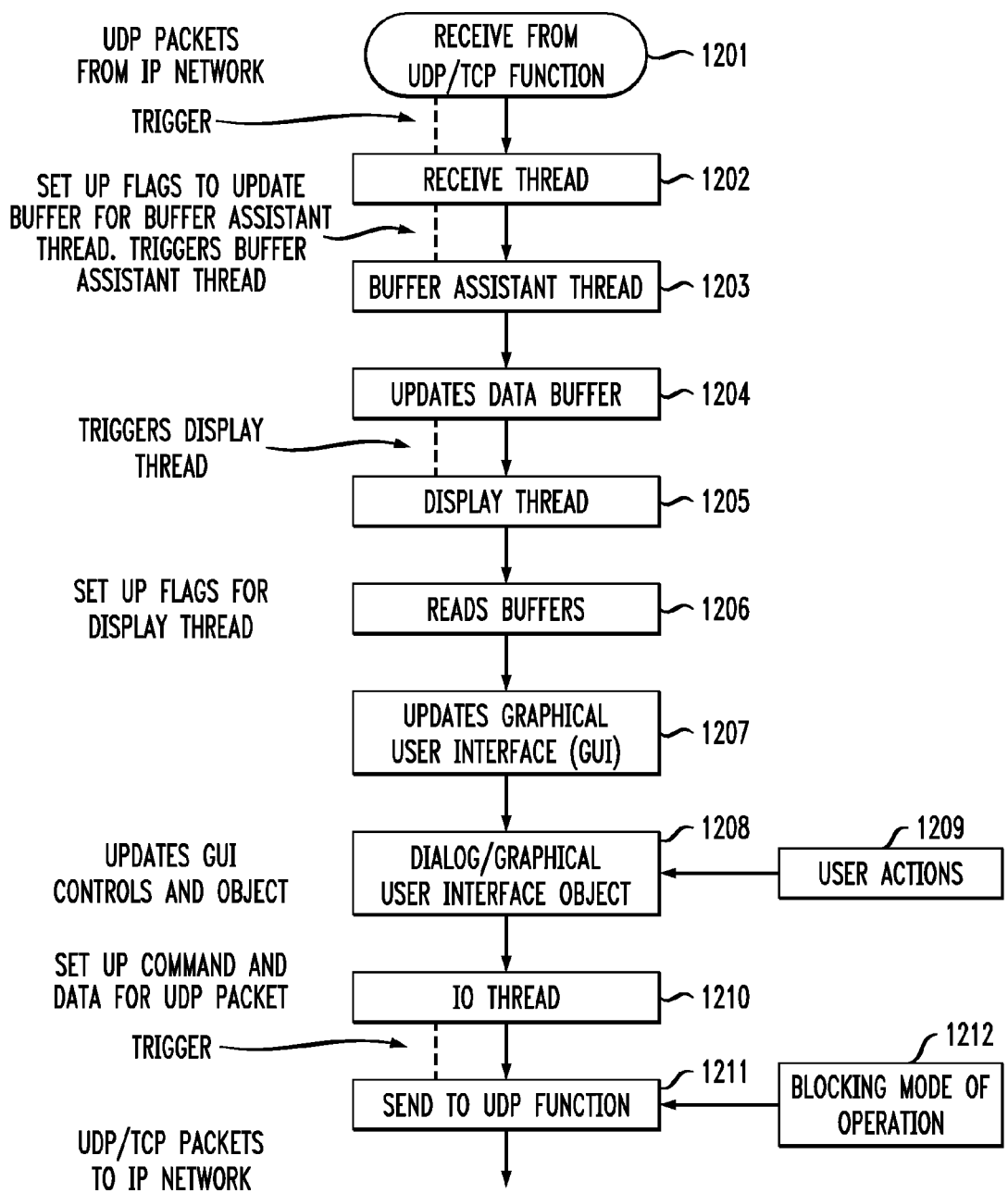
FIG. 12 is a flowchart showing the steps in the operation of the RTT in processing information received from the device.

FIG. 12 is a flowchart showing the steps in the operation of the RTT in processing information received from the IP Phone 101 chipset. The RTT process is started in step 1201 by receiving packets from the IP Phone chipset UDP/TCP function. This also triggers the receive thread that runs in step 1202. Flags are setup to update buffers which triggers the buffer assistant thread that runs in step 1203. Step 1204 updates the data buffer. The display thread runs in step 1205. which sets up the flags associated with display thread. This causes the buffers to be read in Step 1206. Then, step 1207 updates the graphical user interface (GUI), i.e., the GUI controls and object are updated. Then, Step 1208 causes generation of a dialog/graphical interface object in response to user actions from step 1209. Step 1210 calls the IO thread, which causes the setup of command and data for UDP packet and triggers the send to UDP function in step 1211 by which the UDP packets are sent to the IP network in the blocking mode of step 1212.

Figure 13:
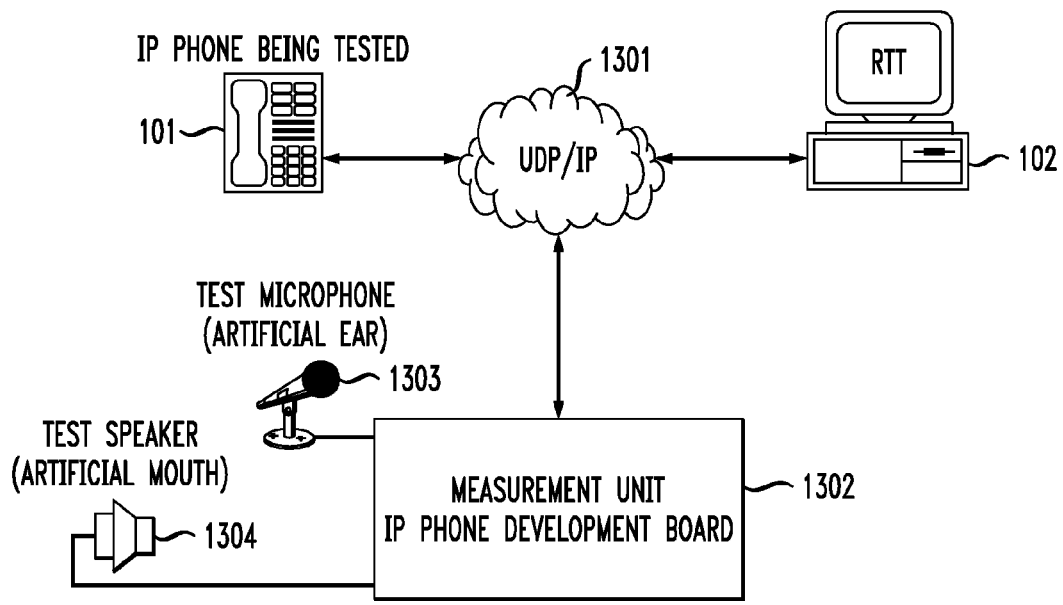
FIG. 13 is a broad block diagram of a system showing use of RTT as a design tool.

FIG. 13 is a broad block diagram of a system showing use of RTT as a design tool. Thus, shown in FIG. 13 are an IP Phone 101 being tested, a PC 102 running RTT, the UDP/IP network 1301, a measurement unit 1302 including an IP Phone development board, a test microphone 1303 and a test speaker 1304. The equipment shown forms an IP Phone, or other similar device, audio tuning tool for product design. With the equipment, design engineers use RTT to qualify the audio performance of the IP Phone, or other similar devices, to determine the optimal set of parameters in real time, for example:

1) Send and receive loudness rating;
2) Send and receive sensitivity measurements;
3) Send and receive equalizers;
4) Echo return loss measurements and control;
5) Echo canceler performance tuning: gains, time constants, switched loss;
6) Noise suppression, thresholds, amount, shaping;
7) Send and receive idle noise measurements;
8) Send and receive comfort noise adjustments; and
9) The like.

Figure 14:
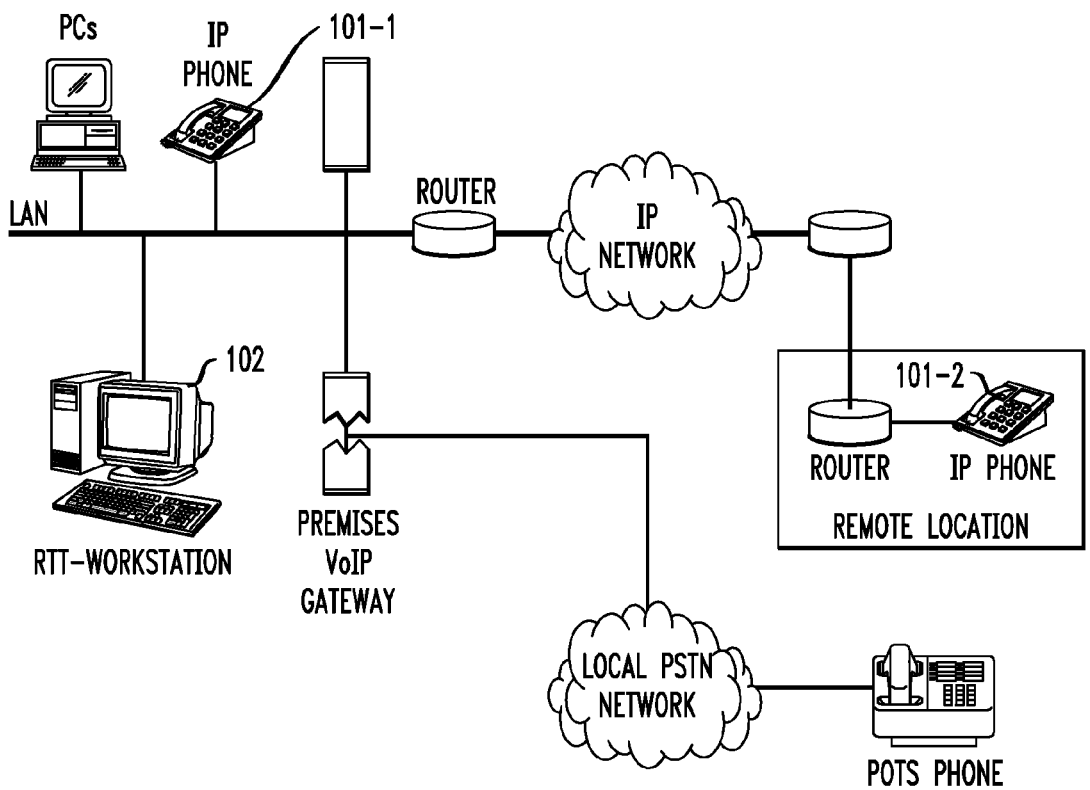
FIG. 14 is a broad block diagram illustrating the RTT being used for field support and maintenance of the device, e.g., the IP phone, in a network.

FIG. 14 is a broad block diagram illustrating the RTT being used for field support and maintenance of the device, e.g., the IP phone, in a network. Thus, shown are IP Phones 101-1 and 101-2, RTT workstation 102, IP network 1401 and other arrangements in the network not relevant to the instant invention. An application support person would connect to IP Phones, for example, 101-1 or 101-2 in network 1401 both in the LAN and at remote location, as shown, to perform various debug and support functions in real time, for example, as follows:
1) Capture real-time audio streams affected by network impairments (packet loss, . . . );
2) Provide reference audio test vectors to the IP Phone;
3) Change audio gains;
4) Monitor echo canceler performance, amount of cancellation;
5) Change all audio related parameters and save them as default values for the IP Phone;
6) Load a new audio executable for test purposes;
7) Load a new audio executable for permanent update; and
8) The like.

Figure 15:
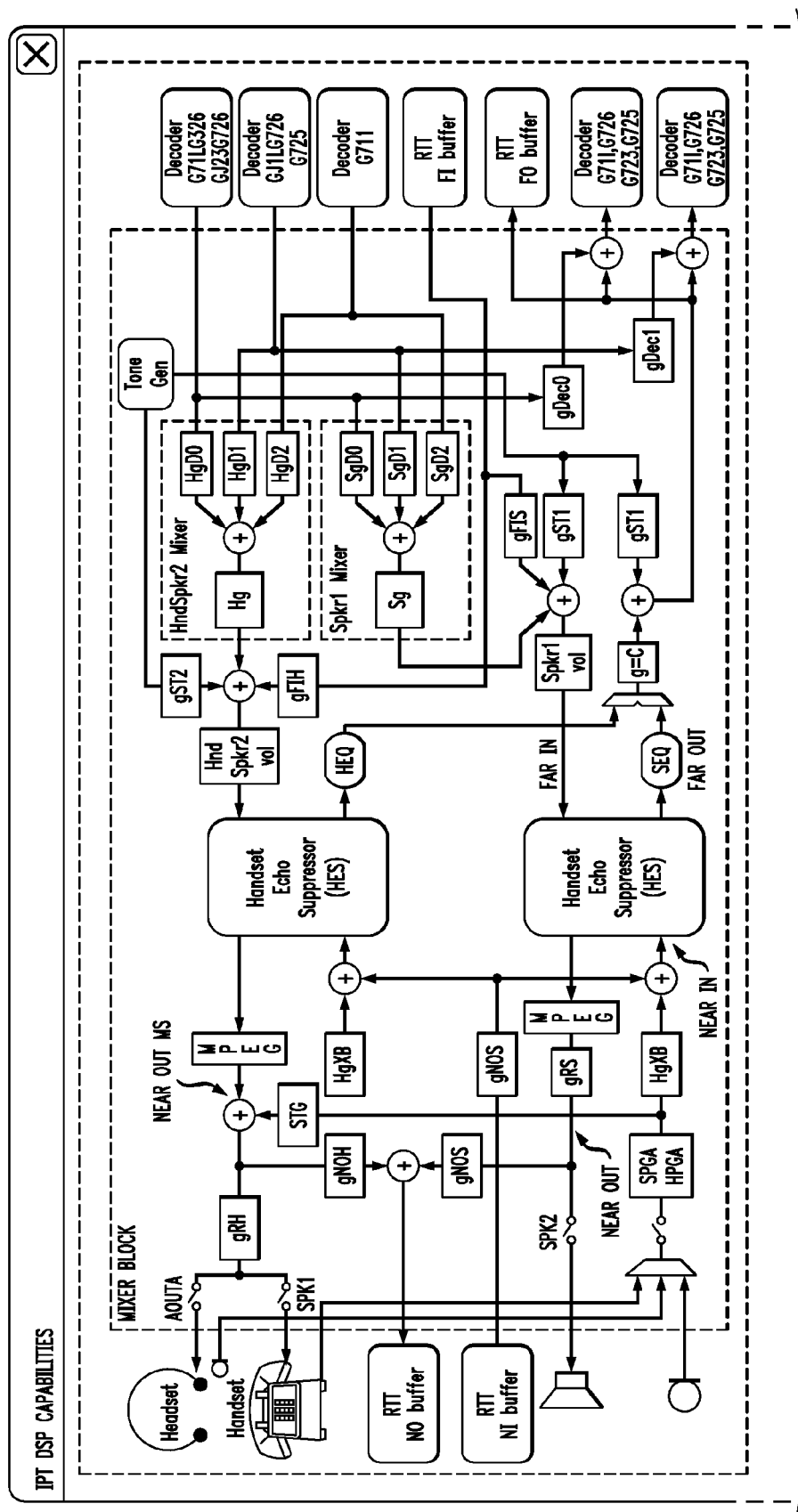
FIG. 15 is a graphical display hat RTT would provide, in this example, of the audio functions on an IP Phone.
Figure 15:
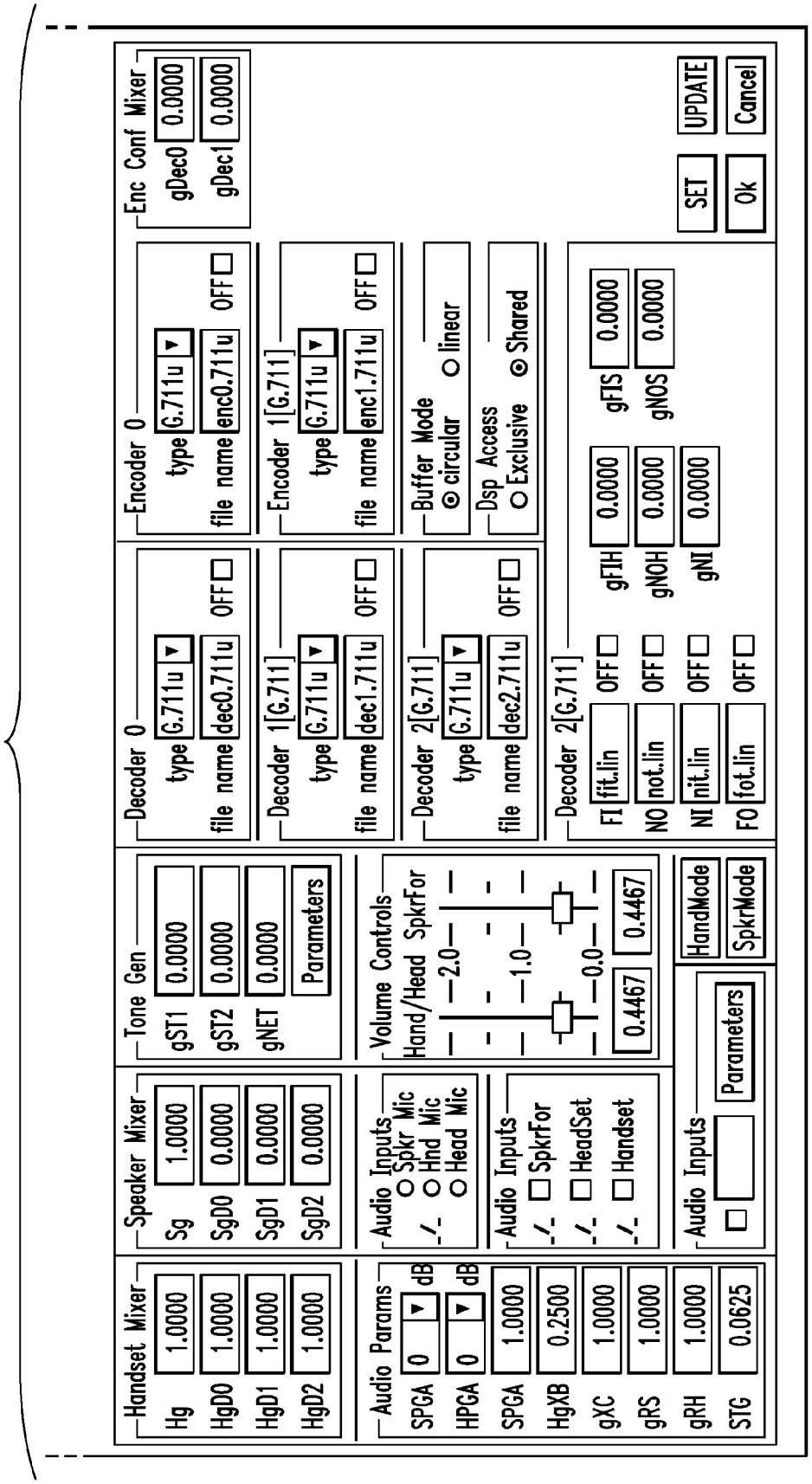

FIG. 15 is a graphical display that RTT would provide, in this example, of the audio functions on an IP Phone. RTT provides a graphical interface to the DSP functionality of the IP Phone, allowing real-time evaluation and optimization of Audio functions such as mixers, equalizer, echo canceler, gains, speech coder compliance etc. FIG. 15 shows the block diagram of the audio functions in a typical IP Phone. The phone designer needs to optimize the various gains and parameters in this block diagram to obtain the highest audio quality.

Figure 16:
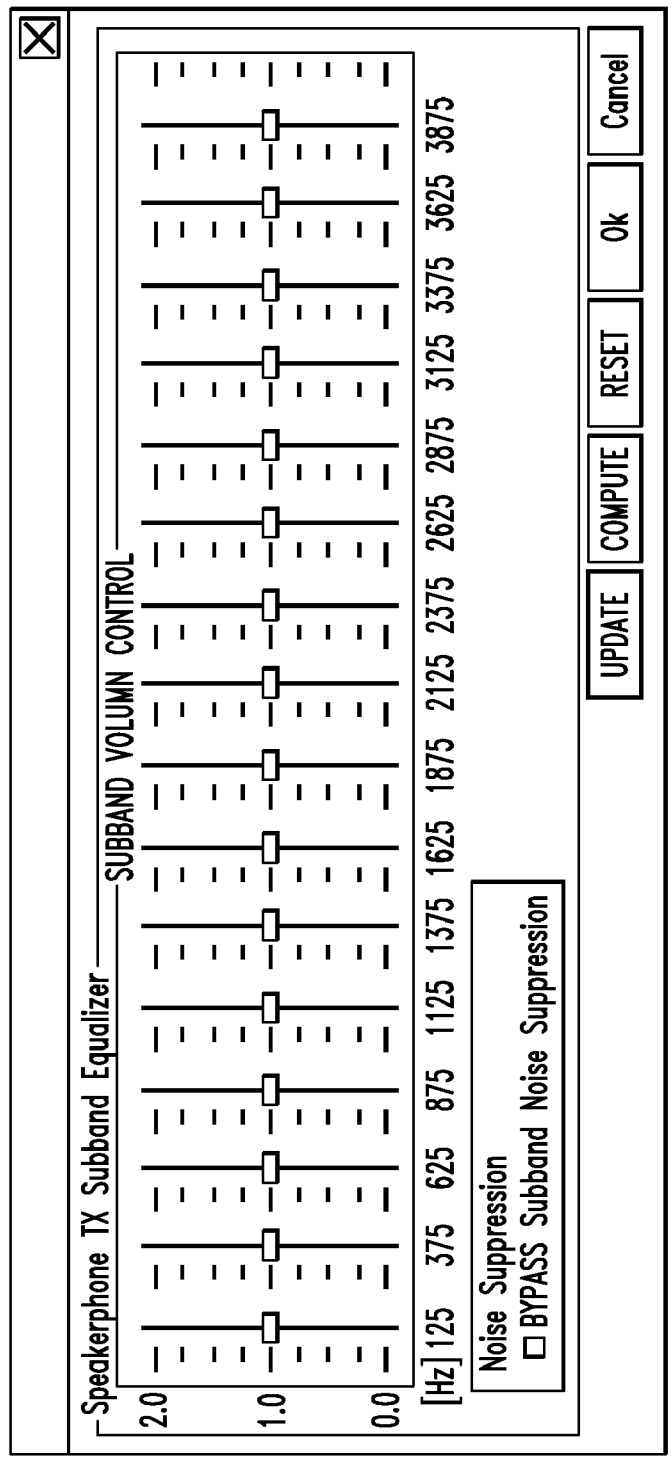
FIG. 16 is a graphical display that RTT would provide of the equalizer control in the IP phone of this example.

FIG. 16 is a graphical display that RTT would provide of the equalizer control in the IP phone of this example. In this example, the transmit equalizers include 16 individual sub-band equalizers that can be used to adjust the level of each sub-band. The transmit equalizer controls are the same for handset and speakerphone operation, but the handset transmit equalizer window contains some controls for handset echo cancellation. The voice range is divided into 16 individual sub-bands with each sub-band 250 Hz wide. The slider bars can be adjusted to provide the desired response for each sub-band. Pressing the Reset button will restore all sliders to the 1.0 position. Changes that are made to the equalizer settings will be reflected in the sending sensitivity curves in the main RTT window. This allows the user to manually adjust the shape of the sensitivity characteristic to have a flat response. The equalizer or noise suppression can be bypassed by checking the corresponding check boxes.

Figure 17:
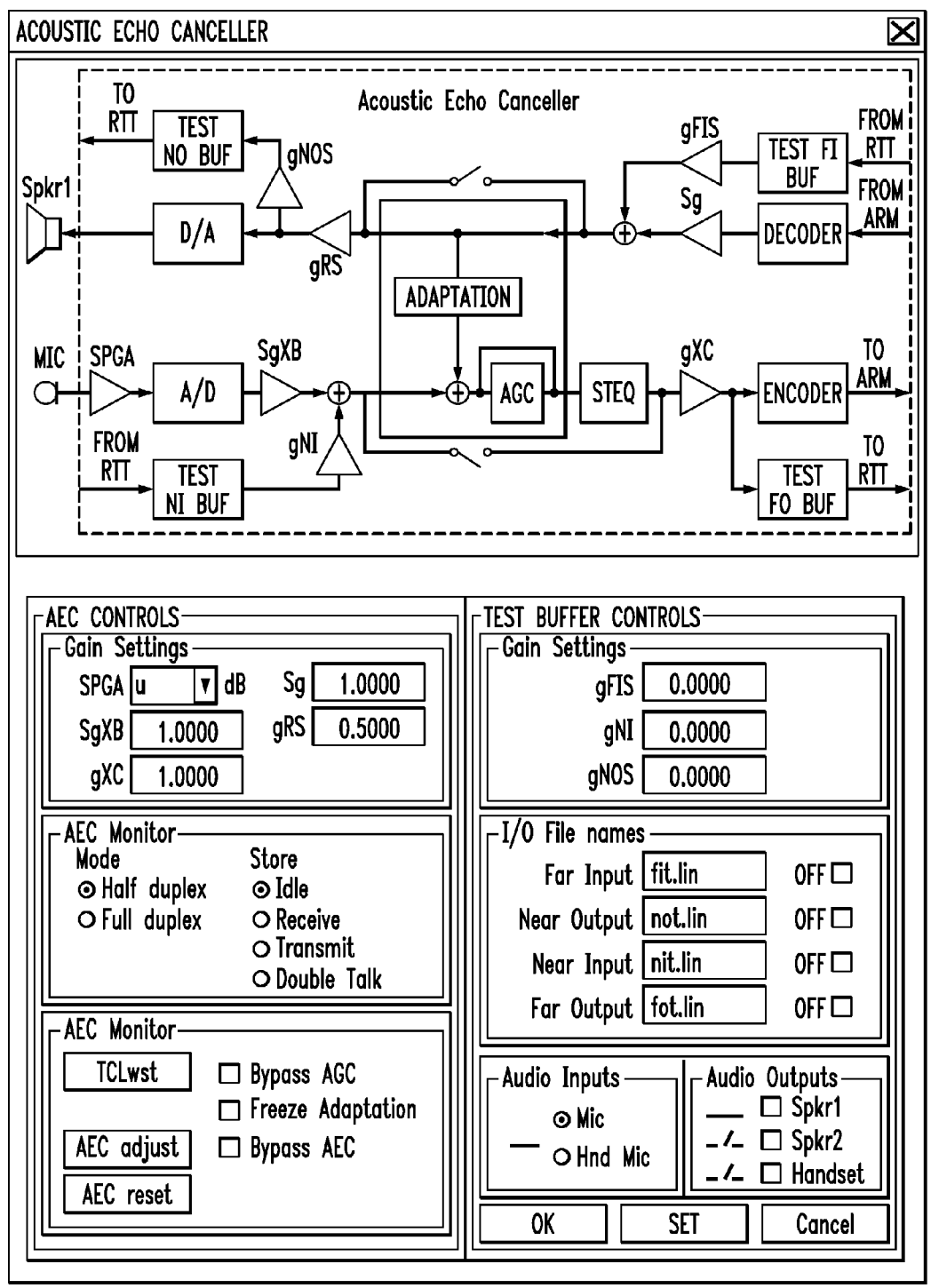
FIG. 17 is a graphical display that RTT would provide of the echo canceler monitoring and control functions control in the IP phone of this example.

FIG. 17 is a graphical display that RTT would provide of the echo canceler monitoring and control functions control in the IP phone of this example.

Figure 18:
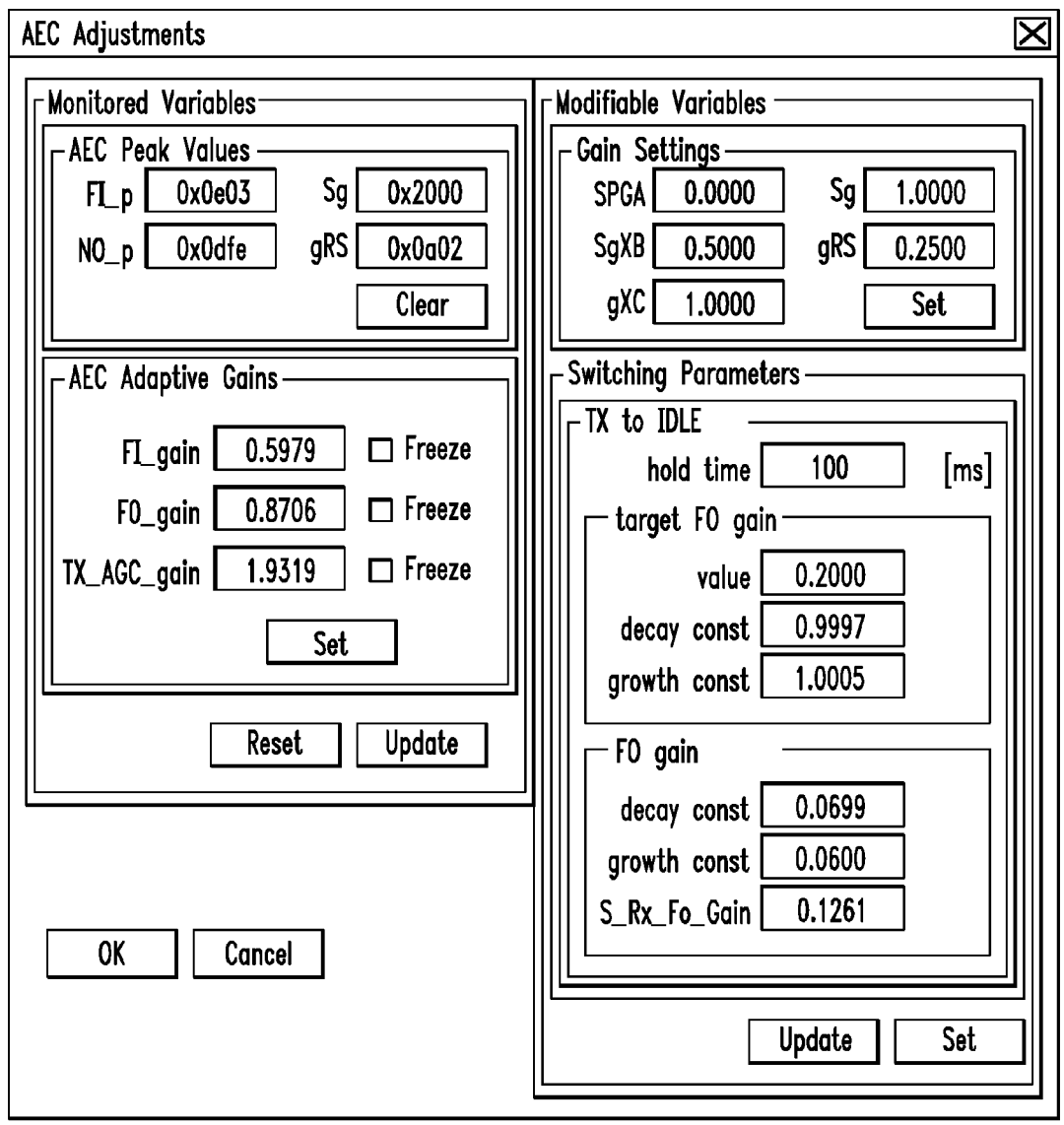
FIG. 18 is a graphical display that RTT would provide of the ACE adjustments in the IP phone of this example.

FIG. 18 is a graphical display that RTT would provide of the AEC adjustments In the IP phone of this example.

Figure 19:
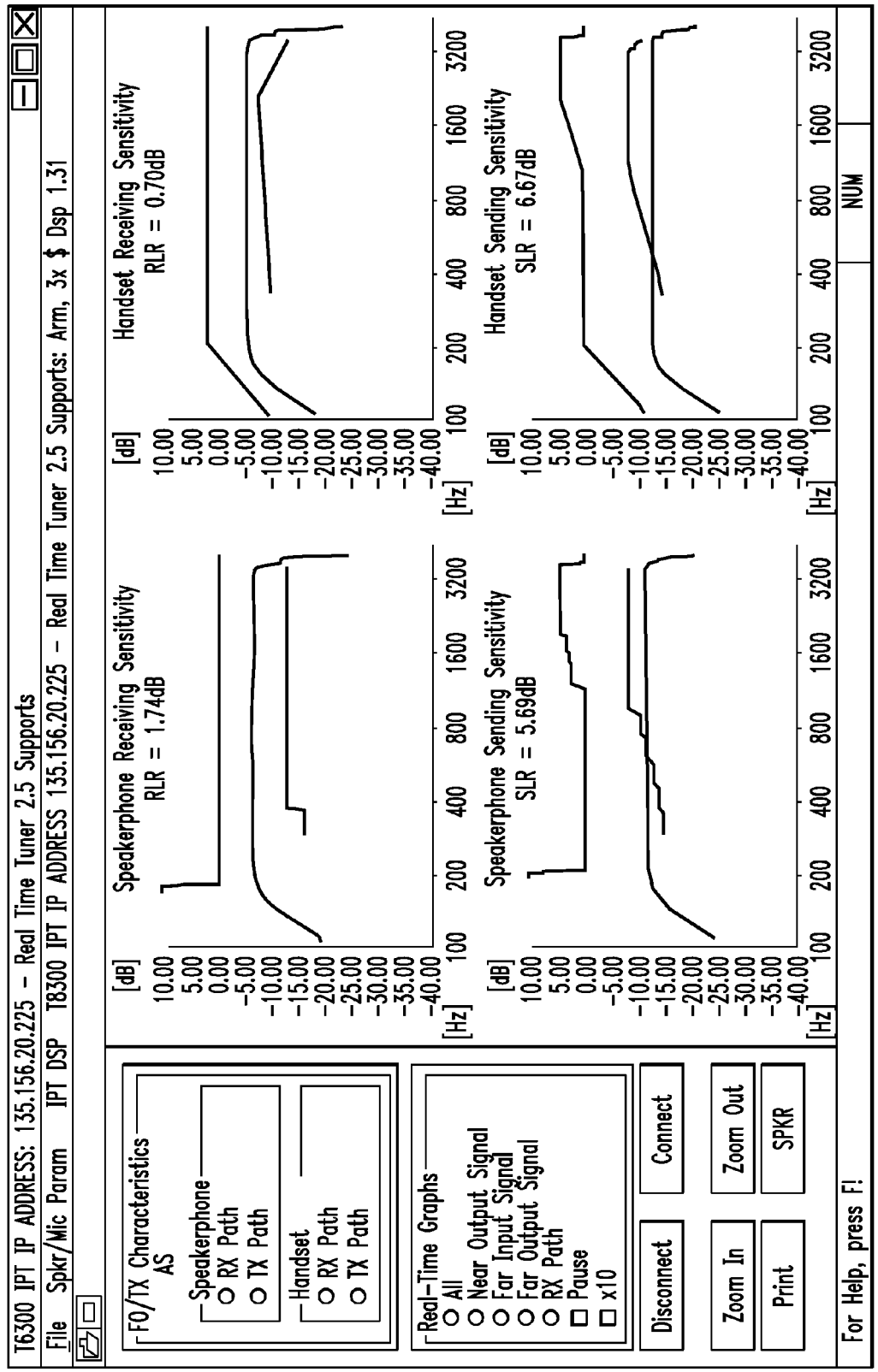
FIG. 19 is a graphical display that RTT would provide of the receive and transmit characteristics in the IP phone of this example.

FIG. 19 is a graphical display that RTT would provide of the receive and transmit characteristics in the IP phone of this example.

Figure 20:
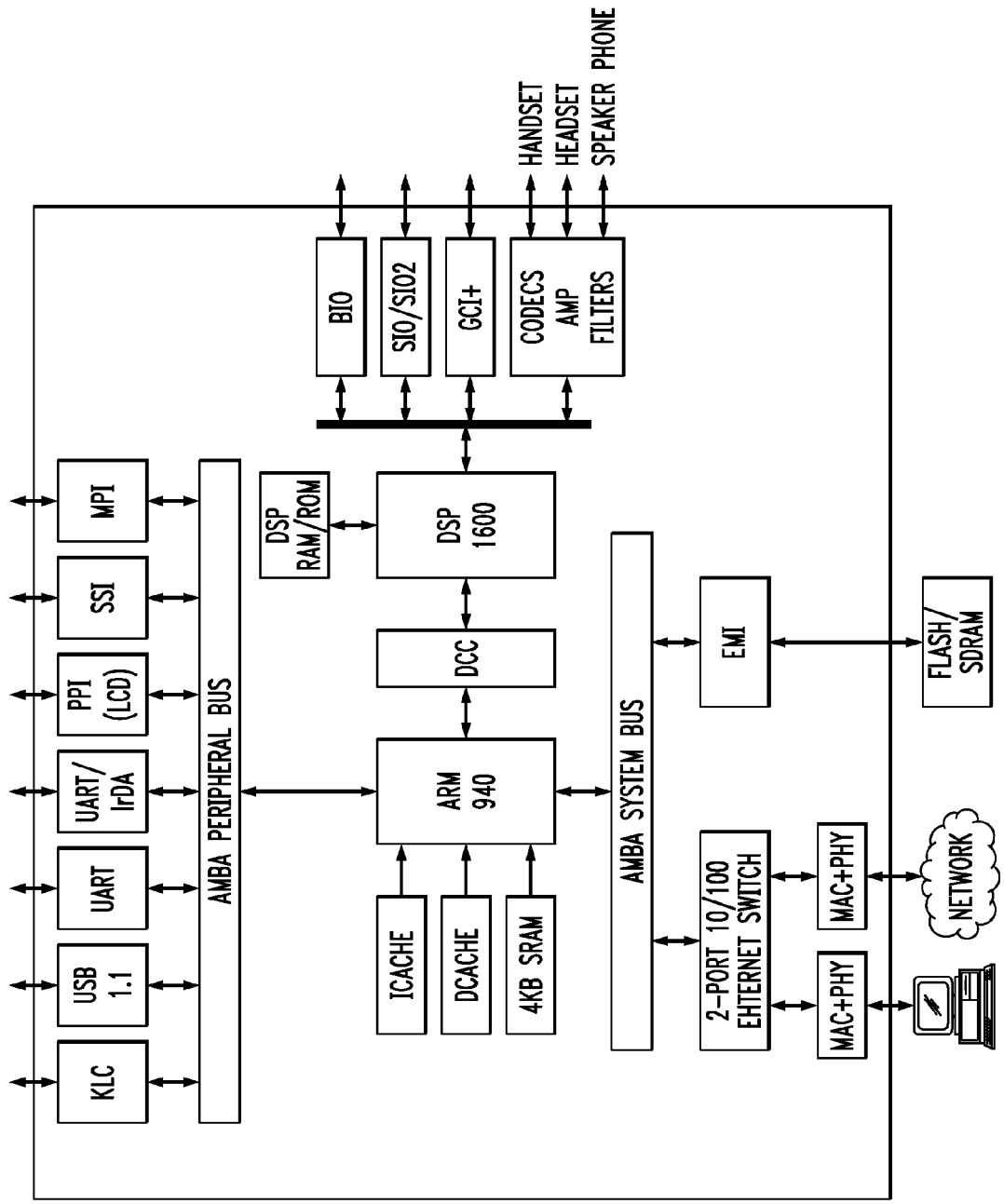
FIG. 20 is a broad block diagram of an implementation of an IP phone.

FIG. 20 is a broad block diagram of an implementation of an IP phone. Thus, shown in FIG. 20 is an IP Phone system based on the SOC (System On a Chip) technology now commercially available from Agere systems. The signal processing unit, usually a DSP (Digital Signal Processor) communicates with the controller through a shared memory, referred to here as DCC (DSP Communication Control). The ARM controller and the DSP exchange information regularly, for example every 10 msec, through DCC. The DSP accepts the commands and the real-time data, and in return provides status and real-time data to the controller. This is achieved through simple put_buffer and get-buffer commands with the specific source and destination addresses of the important audio parameters such as equalizer gains, volume control, programmable analog gains, echo canceler parameters, encoded (PCM, G.729, or other speech coders) or linear audio streams. In a variant of this invention all of the IP Phone functionality is implemented by a single processor, for example a fast version of the ARM controller.

The unique combination of the Windows RTT application, the UDP server and the Signal Processing Unit cooperate advantageously to implement the desired observability and control to audio designers to tune their IP Phone in real-time to the required hardware, plastics, audio requirements dictated by IP Phone standards such as RTT takes advantage of the hardware and Software pieces present in an IP Phone (UDP protocol, TCP protocol, Digital Signal Processor, ARM Controller), and with a small additional complexity offers a myriad of capabilities as a real-time design aid to audio engineers. See flow charts shown in FIGS. 2-12 for the software implementation.

The above-described methods and apparatus are, of course, merely illustrative of the principles of the invention. Indeed, numerous other methods or apparatus may be devised by those skilled in the art without departing from the spirit and scope of the invention.

The invention claimed is:

1. A method for adjusting one or more controllable parameters of an Internet Protocol (IP) audio device comprising the steps of:
   interfacing the IP audio device to a user terminal by employing a networking protocol server, wherein the IP audio device comprises the network protocol server, an IP audio device processor, and a buffer shared by the network protocol server and the IP audio device processor, wherein the IP audio device processor performs IP audio device functions based on the one or more controllable parameters;
   receiving, from the user terminal, command and control messages at said server;
   writing the received command and control messages from said server to the shared buffer;
   reading the written command and control messages from the shared buffer to the IP audio device processor;
   in response to said read command and control messages, adjusting, by the IP audio device processor, one or more of said controllable parameters associated with said command and control messages;
   writing data resulting from the adjustment of said one or more parameters by the IP audio device processor into the shared buffer;
   reading the data resulting from the adjustment of said one or more parameters from the shared buffer into said server; and
   generating, by said server, send packets including the data resulting from the adjustment of said one or more parameters and transmitting said send packets from said server to said user terminal, wherein communicating said packets of data between said IP audio device and said user terminal is in real time, while the IP audio device processor is in operation on a live IP phone conversation with another audio device different from said user terminal.

2. The method as defined in claim 1 wherein said networking protocol is a user datagram protocol.

3. The method as defined in claim 1 wherein said networking protocol is a transmission control protocol.

4. The method as defined in claim 1 wherein said IP audio device is an IP Phone.

5. A method for displaying on a graphical user interface at a user terminal steps in a process for adjusting one or more controllable parameters of an Internet Protocol (IP) audio device comprising the steps of:

interfacing the user terminal to the IP audio device by employing a networking protocol client, wherein the IP audio device comprises a network protocol server, an IP audio device processor, and a buffer shared by the network protocol server and the IP audio device processor, wherein the IP audio device processor performs IP audio device functions based on the one or more controllable parameters;

transmitting command and control messages from said networking protocol client to said server of said IP audio device;

receiving, from said server of said IP audio device, results of the adjustments of the controllable parameters in said IP audio device at said networking protocol client; and utilizing said results of the adjustments of the controllable parameters in the IP audio device to display said steps in the adjustment process at said user terminal graphical interface, wherein communications between said IP audio device and said user terminal is in real time, while the IP audio device processor is in operation on a live IP phone conversation with another audio device different from said user terminal.

6. The method as defined in claim 5 wherein said networking protocol is a user datagram protocol.

7. The method as defined in claim 5 wherein said networking protocol is a transmission control protocol.

8. The method as defined in claim 5 wherein said IP audio device is an IP Phone.

9. The method as defined in claim 5 wherein said user terminal is a workstation including a personal computer system comprised of at least a central processor unit, a monitor, a keyboard, a mouse and the like.

10. A method for adjusting one or more controllable parameters of an Internet Protocol (IP) audio device from a user terminal, the method comprising:

at the IP audio device the steps of,
  interfacing the IP audio device to the user terminal by employing a networking protocol server, wherein the IP audio device comprises the network protocol server, an IP audio device processor, and a buffer shared by the network protocol server and the IP audio device processor, wherein the IP audio device processor performs IP audio device functions based on the one or more controllable parameters,
  receiving, from the user terminal, command and control messages at said server,
  writing the received command and control messages from said server to the shared buffer;
  reading the written command and control messages from the shared buffer to the IP audio device processor, and
  in response to said read command and control messages, adjusting, by the IP audio device processor, one or more of said controllable parameters associated with said command and control messages; and at the user terminal the steps of,
  displaying on a graphical user interface at the user terminal steps in a process for adjusting the one or more controllable parameters of the IP audio device including the steps of,
    interfacing the user terminal to the IP audio device by employing a networking protocol client,
    transmitting the command and control messages from said networking protocol client to said server of said IP audio device,
    receiving, from said server of said IP audio device, results of the adjustments of the controllable parameters in said IP audio device at said networking protocol client, and
    utilizing said results of the adjustments of the controllable parameters in the IP audio device to display said steps in the adjustment process at said user terminal graphical interface, wherein communications between said IP audio device and said user terminal is in real time, while the IP audio device processor is in operation on a live IP phone conversation with another audio device different from said user terminal.

11. The method as defined in claim 10 wherein each of said networking protocols is a user datagram protocol.

12. The method as defined in claim 10 wherein said IP audio device is an IP Phone.

13. The method as defined in claim 10 further including, at said IP audio device, steps of:
  writing data resulting from the adjustment of said one or more parameters by the IP audio device processor into the shared buffer;
  reading the data resulting from the adjustment of said one or more parameters from the shared buffer into said server; and
  generating, by said server, send packets including the data resulting from the adjustment of said one or more parameters and transmitting said send packets from said server to said user terminal.

14. The method as defined in claim 10 wherein said user terminal is a workstation including a personal computer system comprised of at least a central processor unit, a monitor, a keyboard, a mouse and the like.

15. An Internet Protocol (IP) audio device comprising:
  a network protocol server;
  an IP audio device processor adapted to perform IP audio device functions based on one or more controllable parameters; and
  a buffer shared by the server and the IP audio device processor, wherein:
    the server is adapted to (1) interface the IP audio device to a user terminal, (2) receive, from the user terminal, command and control messages, and (3) write the received command and control messages to the shared buffer;
    the IP audio device processor is adapted to (a) read the written command and control messages from the shared buffer and (b) in response to said read command and control messages, adjust one or more of said controllable parameters associated with said command and control messages;
    the IP audio device processor is further adapted to write data resulting from the adjustment of said one or more parameters from the IP audio device processor into the shared buffer; and
    the server is further adapted to (c) read the data resulting from the adjustment of said one or more parameters from the shared buffer,(d) generate send packets including the data resulting from the adjustment of said one or more parameters, and (e) transmit said send packets to said user terminal, wherein the server is adapted to communicate said packets of data between said IP audio device and said user terminal in real time, while the IP audio device processor is in operation on a live IP phone conversation with another audio device different from said user terminal.

16. The IP audio device as defined in claim 15 wherein said networking protocol is a user datagram protocol.

17. The IP audio device as defined in claim 15 wherein said networking protocol is a transmission control protocol.

18. The IP audio device as defined in claim 15 wherein said IP audio device is an IP Phone.

* * * * *